(12) United States Patent
Chen et al.

(10) Patent No.: US 8,909,519 B2
(45) Date of Patent: *Dec. 9, 2014

(54) VOICE ACTIVITY DETECTION/SILENCE SUPPRESSION SYSTEM

(71) Applicant: AT&T Intellectual Property II, L.P., Atlanta, GA (US)

(72) Inventors: Bing Chen, Red Bank, NJ (US); James H. James, Farmingdale, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/202,640

(22) Filed: Mar. 10, 2014

(65) Prior Publication Data

US 2014/0195228 A1 Jul. 10, 2014

Related U.S. Application Data

(63) Continuation of application No. 14/047,690, filed on Oct. 7, 2013, now Pat. No. 8,700,390, which is a continuation of application No. 13/712,323, filed on Dec. 12, 2012, now Pat. No. 8,577,674, which is a continuation of application No. 13/050,022, filed on Mar. 17, 2011, now Pat. No. 8,346,543, which is a continuation of application No. 10/942,518, filed on Sep. 16, 2004, now Pat. No. 7,917,356.

(51) Int. Cl.
*G10L 21/00* (2013.01)
*G10L 15/20* (2006.01)
*G10L 25/84* (2013.01)
*G10L 25/78* (2013.01)

(52) U.S. Cl.
CPC .............. *G10L 25/84* (2013.01); *G10L 15/20* (2013.01); *G10L 25/78* (2013.01)
USPC ........... 704/210; 704/208; 704/214; 704/215; 704/226; 704/233

(58) Field of Classification Search
USPC .......... 704/208, 210, 214, 215, 226–228, 233
See application file for complete search history.

(56) References Cited

U.S. PATENT DOCUMENTS

| | | |
|---|---|---|
| 4,696,039 A | 9/1987 | Doddington |
| 5,974,374 A | 10/1999 | Wake |
| 6,453,041 B1 | 9/2002 | Eryilmaz |
| 6,522,746 B1 | 2/2003 | Marchok et al. |
| 6,526,139 B1 | 2/2003 | Rousell et al. |
| 6,526,140 B1 | 2/2003 | Marchok et al. |
| 6,606,593 B1 | 8/2003 | Jarvinen et al. |
| 6,621,812 B1 | 9/2003 | Chapman et al. |
| 6,889,187 B2 | 5/2005 | Zhang |
| 7,272,552 B1 | 9/2007 | James et al. |
| 2001/0014857 A1 | 8/2001 | Wang |
| 2001/0033583 A1 | 10/2001 | Rabenko et al. |
| 2002/0006137 A1 | 1/2002 | Rabenko et al. |
| 2002/0021711 A1 | 2/2002 | Gummalla et al. |
| 2002/0061012 A1 | 5/2002 | Thi et al. |
| 2002/0064139 A1 | 5/2002 | Bist et al. |

(Continued)

*Primary Examiner* — Leonard Saint Cyr
(74) *Attorney, Agent, or Firm* — Hoffmann & Baron, LLP

(57) ABSTRACT

A Voice Activity Detection/Silence Suppression (VAD/SS) system is connected to a channel of a transmission pipe. The channel provides a pathway for the transmission of energy. A method for operating a VAD/SS system includes detecting the energy on the channel, and activating or suppressing activation of the VAD/SS system depending upon the nature of the energy detected on the channel.

20 Claims, 5 Drawing Sheets

(56) References Cited

U.S. PATENT DOCUMENTS

| | | |
|---|---|---|
| 2002/0064169 A1 | 5/2002 | Gummalla et al. |
| 2002/0076034 A1 | 6/2002 | Prabhu et al. |
| 2002/0110152 A1 | 8/2002 | Schaffer |
| 2002/0116186 A1 | 8/2002 | Strauss et al. |
| 2002/0120440 A1 | 8/2002 | Zhang |
| 2002/0165711 A1 | 11/2002 | Boland |
| 2003/0053618 A1 | 3/2003 | Marchok et al. |
| 2003/0078767 A1 | 4/2003 | Nayak |
| 2003/0091182 A1 | 5/2003 | Marchok et al. |
| 2003/0120484 A1 | 6/2003 | Wong et al. |
| 2003/0123535 A1 | 7/2003 | Nayak |
| 2003/0125910 A1 | 7/2003 | Randmaa et al. |
| 2003/0138061 A1 | 7/2003 | Li |
| 2003/0204397 A1 | 10/2003 | Amiri et al. |
| 2003/0212548 A1 | 11/2003 | Petty |
| 2003/0212550 A1 | 11/2003 | Ubale |
| 2004/0002856 A1 | 1/2004 | Bhaskar et al. |
| 2005/0015489 A1 | 1/2005 | Whynot et al. |
| 2005/0038651 A1 | 2/2005 | Zhang et al. |

VOICE ACTIVITY DETECTION/SILENCE SUPPRESSION SYSTEM

CROSS REFERENCE TO RELATED APPLICATIONS

This application is a continuation of U.S. application Ser. No. 14/047,690, filed 7 Oct. 2013, entitled "OPERATING METHOD FOR VOICE ACTIVITY DETECTION/SILENCE SUPPRESSION SYSTEM", which is a continuation of U.S. application Ser. No. 13/712,323, filed 12 Dec. 2012, entitled "OPERATING METHOD FOR VOICE ACTIVITY DETECTION/SILENCE SUPPRESSION SYSTEM", now U.S. Pat. No. 8,577,674, which is a continuation of U.S. application Ser. No. 13/050,022, filed 17 Mar. 2011, entitled "OPERATING METHOD FOR VOICE ACTIVITY DETECTION/SILENCE SUPPRESSION SYSTEM", now U.S. Pat. No. 8,346,543, which is a continuation of U.S. application Ser. No. 10/942,518, filed 16 Sep. 2004, entitled "OPERATING METHOD FOR VOICE ACTIVITY DETECTION/SILENCE SUPPRESSION SYSTEM", now U.S. Pat. No. 7,917,356. The disclosures of each of these prior applications are incorporated by reference herein in their entirety.

BACKGROUND

1. Field

The embodiments disclosed herein relate generally to a method for operating a Voice Activity Detection/Silence Suppression System (VAD/SS system) and more specifically, a method for selectively activating the VAD/SS system.

2. Related Art

A VAD/SS system provides for voice activity detection (VAD) and silence suppression (SS). VAD provides for the detection of voice energy on a channel of a transmission pipe for an electrical communication system. Not detecting such voice energy may be considered as the detection of silence. Such silence may nevertheless be transmitted over such transmission pipes because of the automatic functioning of the communication system. Such transmission of silence is normally undesirable since it occupies the channel with the transmission of energy which does not convey useful information. Accordingly, it is desirable for such transmission of silence to be suppressed.

Such suppression of the transmission of silence is provided by the SS portion of the VAD/SS system. Silence Suppression further provides for the making of the channel, over which the silence has been suppressed, available for the transmission of active voice energy from other channels of the transmission pipe. This effectively blocks the transmission path between the original speakers/listeners provided by the channel. Also, this provides for a more efficient use of the transmission pipe by reducing the portion thereof which is carrying silence. Bandwidth savings, or compression, are thereby provided by allowing multiple connections to share the bandwidth of a large transmission pipe. Less overall bandwidth is required resulting in saving for the transmission service provider and transmission service customer.

The VAD/SS system may also provide a noise-matching process where the decoding end of the connection or channel supplies some noise during periods when the VAD has determined the absence of speech. The purpose of this supplied noise, also referred to as matching noise, is to mask the operation of the VAD/SS system on connections that contain noise in addition to the voice energy which is detected by the VAD. Such additional noise may be referred to as actual channel noise or background noise. On such connections the listener hears this actual channel noise when the other party is speaking. However, when that party stops speaking and the VAD determines that the connection is in a non-voice state, i.e., detects silence, the SS initiates silence suppression which makes the channel unavailable to the listener. As a result, the listener no longer hears the actual channel noise. These transitions between channel noise present and channel noise absent produce an unnatural sound that may raise concerns of the listener regarding the proper functioning of the communication link. Also, such concerns may be raised by the complete absence of audible sounds.

The unnatural sounds associated with the transitions between the presence and absence of the actual channel noise may be disguised to some extent by the addition of the matching noise. This improves the experience of the listener. The extent to which the transition is disguised depends upon the similarity between the actual channel noise, and the matching noise. Unfortunately, matching noise from known VAD/SS systems typically has a relatively constant frequency and decible level, and, thus has a relatively basic sound. Such matching noise may be sufficiently different from the actual channel noise, especially where this actual noise is dynamic, that the addition of the matching noise may result in an audible transition from the actual channel noise, and an unnatural sound.

SUMMARY

A VAD/SS system is connected to a channel of a transmission pipe. The channel provides a pathway for the transmission of energy. The method for operating a VAD/SS system includes detecting the energy on the channel, and activating or suppressing activation of the VAD/SS system depending upon the nature of the energy detected on the channel.

One embodiment provides for detecting the presence or absence of voice energy on a channel of a transmission pipe. If voice energy on the channel is detected, the method provides for suppressing activation of the VAD/SS system. If voice energy on the channel is not detected, the method provides for determining whether the noise is constant or dynamic. If the noise detected on the channel is constant, the method provides for activating the VAD/SS system. If the noise detected on the channel is dynamic, the method further provides for suppressing activation of the VAD/SS system.

This method restricts activation of the VAD/SS system to conditions when the noise detected is constant. Moreover, the method provides for suppressing the activation of the VAD/SS system when the noise detected is dynamic. This selective activation of the VAD/SS system enhances the effectiveness thereof by limiting the activation to conditions when the noise detected is most similar to the matching noise supplied by known VAD/SS systems to the listener. This increases the likelihood that the listener will not audibly detect the transition between the actual channel noise and the matching noise, thereby reducing any concerns of the listener regarding the proper functioning of the communication system which may result from such audible transitions. This increases the number of channels which may be provided by a fixed bandwidth thereby increasing the compression thereof and bandwidth savings.

These and other features will be more fully understood from the following description of specific embodiments taken together with the accompanying drawings.

BRIEF DESCRIPTION OF THE DRAWINGS

In the drawings.

Corresponding reference characters indicate corresponding parts throughout the several views of the drawings.

DETAILED DESCRIPTION

Figure 1:
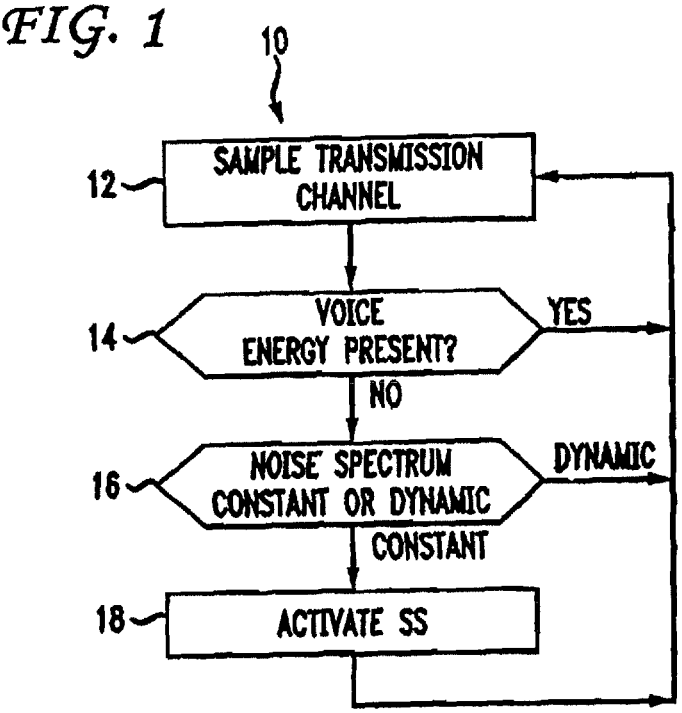
FIG. 1 is a block diagram showing the method for operating a VAD/SS System.

Referring to the drawings, and more particularly to FIG. 1, a method 10 is shown for operating a Voice Activity Detection/Silence Suppression System (VAD/SS system). The VAD/SS system is typically used with a transmission pipe having multiple channels, each of which provides for transmission of electrical communication signals containing voice energy. Such a transmission pipe having multiple channels is often considered as having a bandwidth. Alternatively, the VAD/SS system may be used with a transmission pipe having a single channel.

A preferred embodiment of the method 10 includes initially sampling the sound transmission on the channel. A sound transmission is typically a telephone call between at least two individuals, referred to herein each as a speaker/listener. The transmission channel is examined for the presence of voice energy, as indicated by the reference numeral 14 in FIG. 1.

If the examination 14 of the transmission channel results in the decision that voice energy is present, then the system loops back to 12 where another sample of the channel's energy is taken.

If the examination of the voice energy on the channel 14 indicates the absence of voice energy thereon, then the VAD/SS system examines the noise on the channel to determine whether the noise is constant or dynamic, as indicated by reference numeral 16 in FIG. 1. This determination of whether the noise is dynamic or constant is preferably made by examining the noise spectrum, as shown in FIG. 1, or the power-frequency spectrum of the noise. This examination may be based on a spectrum constancy criteria which may be determined according to various methodologies. For example, the peak/average energy ratio may be calculated for the whole spectrum. Alternatively, the peak/valley energy ratio may be calculated for the whole frequency band or for each sub-band. Another alternative is to calculate the sum of the squares of the energy difference between adjacent sub-bands. A still further alternative is to determine whether or not the peaks are harmonic frequencies. Based on one or multiple calculations, the constancy threshold for the system may be defined.

If the examination of the noise on the channel 16 indicates that the noise is dynamic, then the system loops back to 12 where another sample of the channel's energy is taken, as shown in FIG. 1. This results in silence suppression not being activated and matching noise not being added. Such matching noise, if added, would likely be noticeably different in sound to the listeners which could raise concerns regarding the proper functioning of the communication system. Such audible differences are avoided by aborting the activation of SS 18.

If the noise spectrum is constant, then the SS system is activated, as indicated by reference numeral 18 in FIG. 1. The noise spectrum is determined to be constant if the channel contains audible sounds such as background or line noise which is constant, or no sound energy whatsoever. The activation 18 provides suppression of the "silence", where "silence" refers to the absence of voice energy on the channel, although the channel may otherwise contain audible sounds such as background or line noise. Thus, even in the absence of voice energy, a communication system frequently continues to transmit audible sounds such as background or line noise, or, in the absence of any sound energy whatsoever, continues to transmit information thereof. Transmission of such audible sounds, or information of no sound energy whatsoever, in the absence of voice energy, is referred to as the transmission of "silence". Such transmission of "silence" is suppressed by the VAD/SS system. As a result, the channel which had been transmitting the "silence" no longer transmits audible energy between the listeners who had been receiving the "silence". The channel thereby becomes available for the transmission of voice or other forms of energy between other listeners. This availability is advantageously used by routing communication links between other listeners over the channel on which the "silence" is suppressed. This re-routing of communication links increases the number of channels which may be provided by a fixed bandwidth thereby increasing the compression thereof and bandwidth savings.

Activation of the VAD/SS system 18 results in the channel no longer providing the communication link between the original listeners who were connected thereby prior to the "silence" suppression. As a result, the "silence", which normally included noise, which was transmitted between the listeners before the activation of the VAD/SS system 18 is no longer received by the listeners from the channel. Thus, during the activation 18, the listeners would normally cease receiving any audible sounds from the channel, in the absence of some alternative source of audible sounds provided to the listeners from the channel. A sudden cessation of all audible sounds from the channel could raise concerns of the listener regarding the proper functioning of the communication system.

The activation of the VAD/SS system 18 includes the addition of matching noise, which provides for the supply of audible sounds to the original listeners, from a source other than transmission from the other listener, during the silence suppression. Such matching noise typically has a relatively constant frequency and decibel level. As a result, each of the original listeners continues to receive an audible sound from the channel during the activation 18 thereby avoiding the complete cessation of such audible sounds which would normally otherwise result from this silence suppression.

The matching noise is likely to more resemble the actual noise on the channel prior to the activation of the VAD/SS system 18 if such actual noise is "constant". This results from the matching noise provided by known VAD/SS systems being typically constant, for example, in frequency and decibel level. Such resemblance is desirable because it increases the likelihood that the original listeners will not notice a change in sound between the actual noise and matching noise. Such a change in sound could raise concerns on the part of the listeners regarding the proper functioning of the communication system. As a result, the activation of the VAD/SS system 18, which includes the addition of the matching noise, occurs when the examination of the spectrum of the actual noise 16 indicates such noise spectrum to be constant.

During activation of the VAD/SS system 18, the channel is monitored for the presence of voice energy, as indicated by the loop back from 18 to 12 in FIG. 1. Such monitoring is preferably continuous, although periodic monitoring is possible.

The determination of whether the noise on the channel is constant or dynamic is preferably made by examining the power-frequency spectrum of the noise. More specifically, the variation in the power fluctuation provides a guide to determining the type of noise. If the power fluctuations are sufficiently small, then the noise is considered to be constant resulting in the VAD/SS system being activated 18. If the power fluctuations are sufficiently large, then the noise is considered to be dynamic resulting in the VAD/SS system being suppressed 18.

An example of constant noise is white noise, which is a noise type that represents the normal telephone line noise. Another example of constant noise is café noise, which is a noise type representative of somewhere where people are gathered and are speaking while other environmental noises are mixed in. An example of dynamic noise is music, which is a noise type that represents what can be coupled into a connection from a background music source, or, as is the case with a music-on-hold feature, the type of noise that is purposefully added to a connection.

The examination of a power-frequency spectrum to determine whether it represents white noise, café noise or music is significantly facilitated by an appropriate measurement window size. The measurement window size may be considered crucial. If the measurement window size is too small, it will reflect very local power fluctuations and not cover enough frequency. But if the measurement window size is increased to a size sufficient to capture the spectrum, any further increase in size ordinarily results in the unnecessary consumption of computational resources and processing delay.

Figure 2:
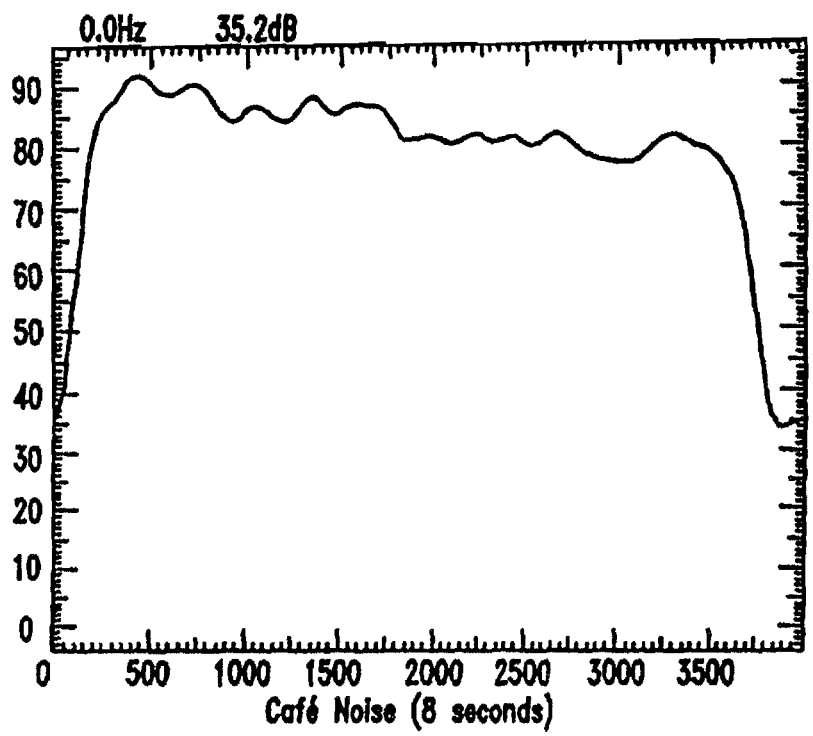
FIG. 2 is a power-spectrum graph of café noise for a measurement window of 8 seconds.
Figure 3:
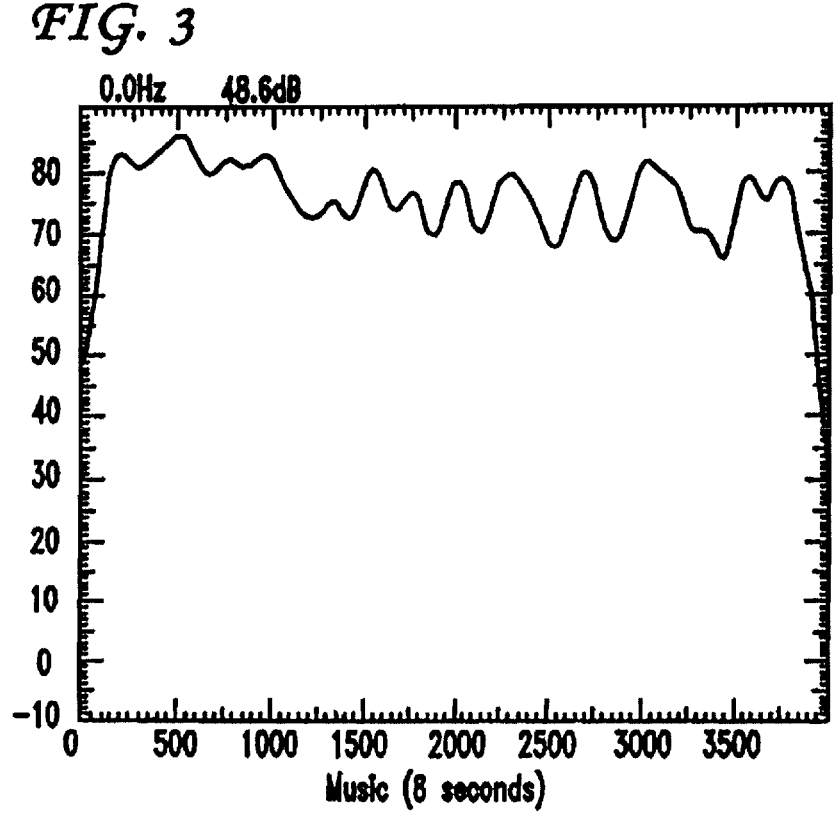
FIG. 3 is a power-spectrum graph of music for a measurement window of 8 seconds.
Figure 4:
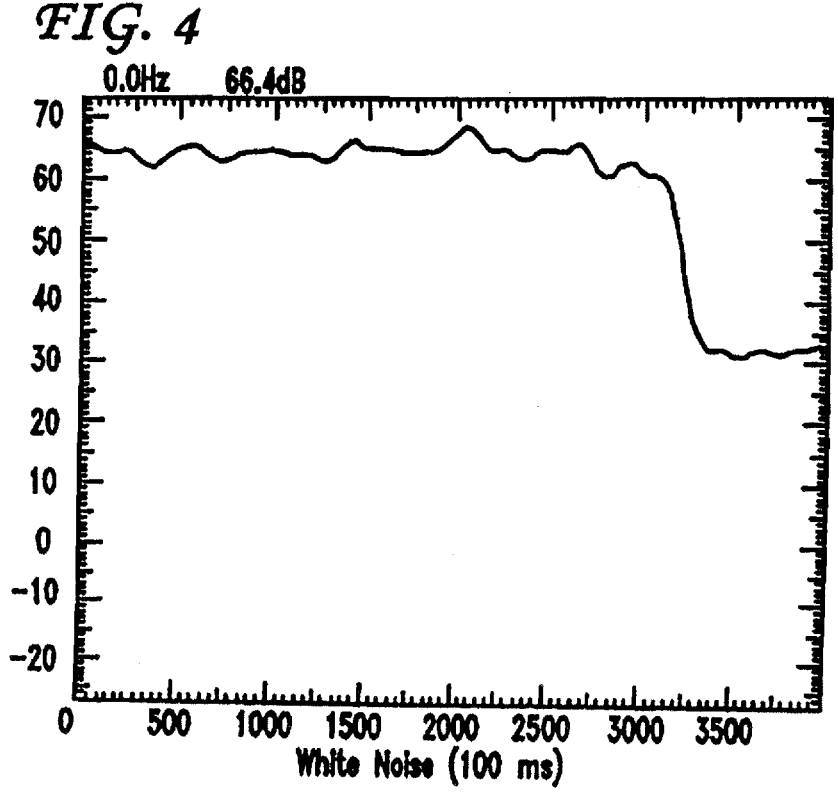
FIG. 4 is a power-spectrum graph of white noise for a measurement window of 100 ms.
Figure 5:
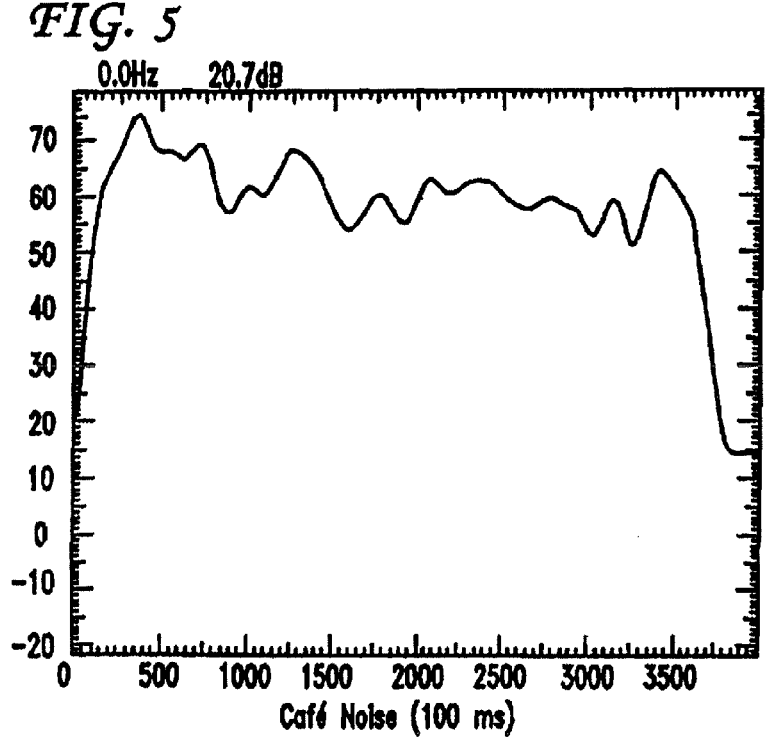
FIG. 5 is a power-spectrum graph of café noise for a measurement window of 100 ms.
Figure 6:
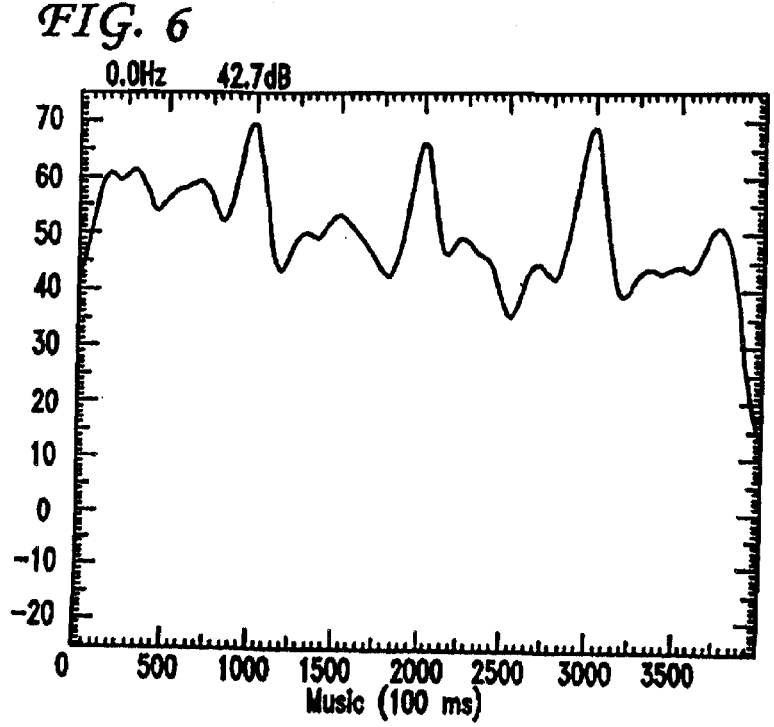
FIG. 6 is a power-spectrum graph of music for a measurement window of 100 ms.
Figure 7:
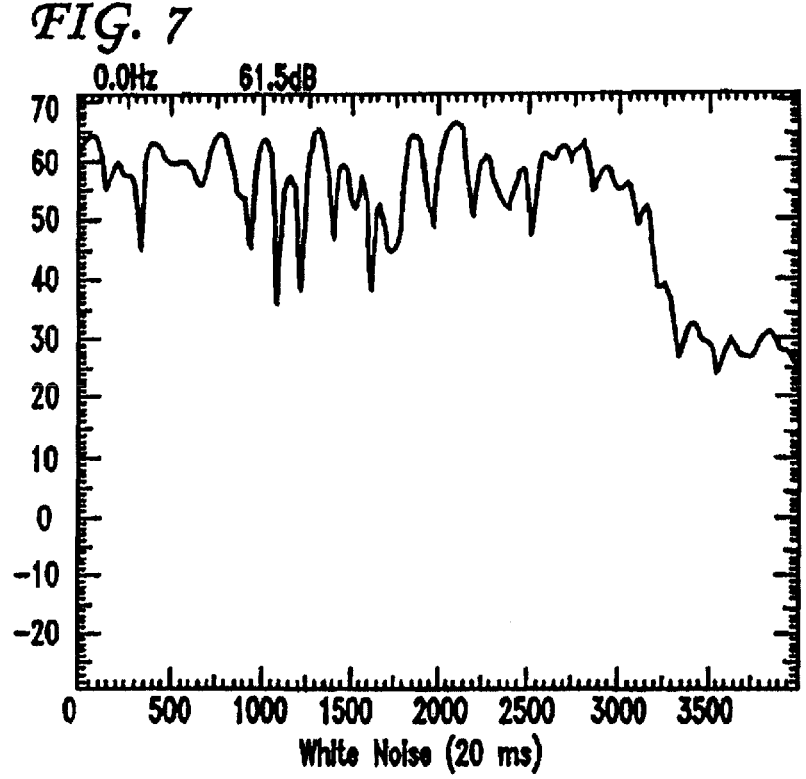
FIG. 7 is a power-spectrum graph of white noise for a measurement window of 20 ms.
Figure 8:
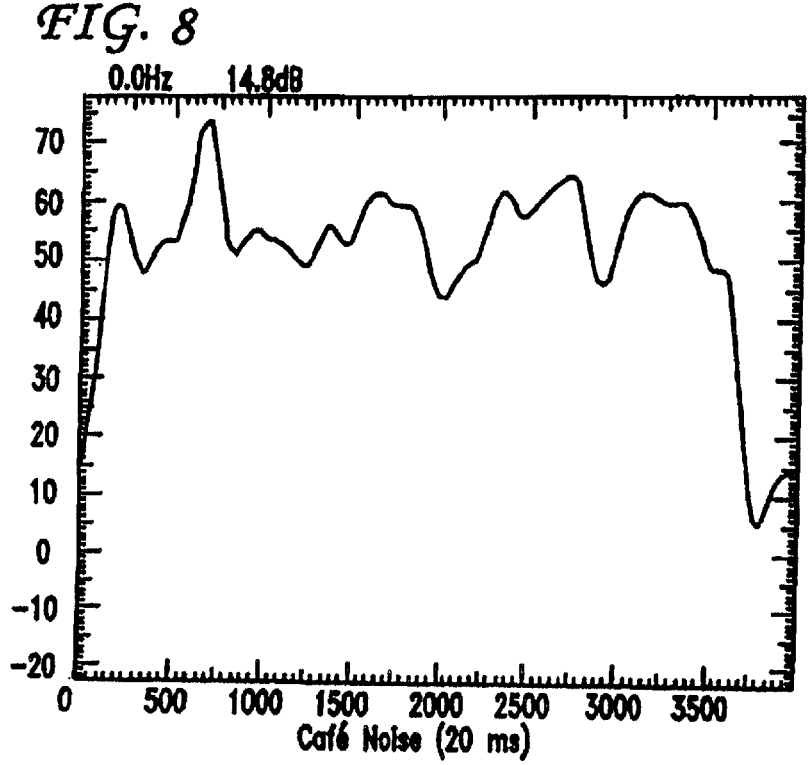
FIG. 8 is a power-spectrum graph of café noise for a measurement window of 20 ms.
Figure 9:
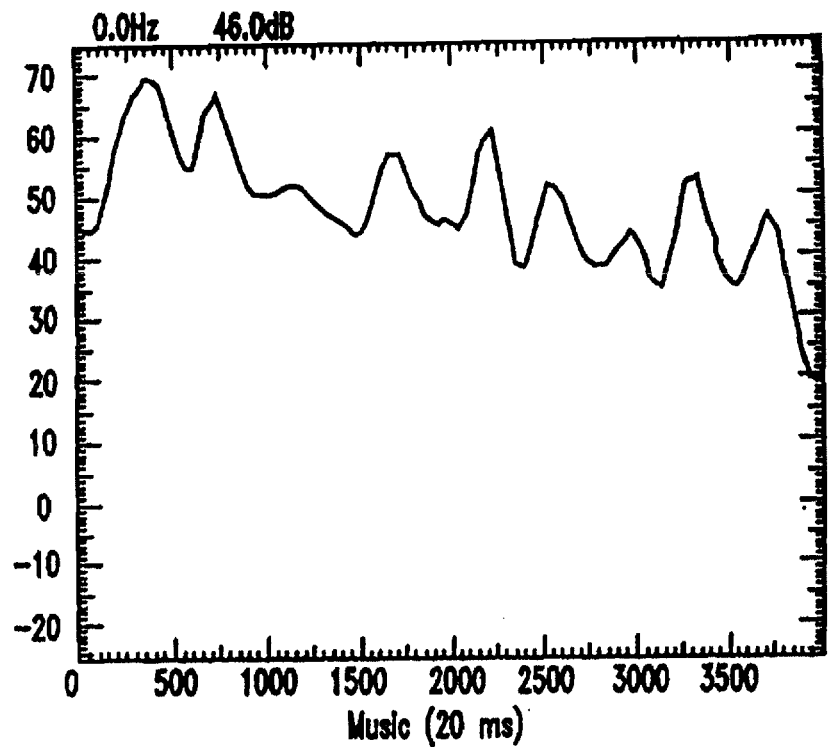
FIG. 9 is a power-spectrum graph of music for a measurement window of 20 ms.

An advantageous measurement window size for white noise, café noise, and music is illustrated by FIGS. 2 to 9. FIGS. 2 and 3 show measurement window sizes of 8 seconds for café noise and music, respectively. FIGS. 4 to 6 show measurement window sizes of 100 ms for white noise, café noise and music, respectively. FIGS. 7 to 9 show measurement window sizes of 20 ms for white noise, café noise and music, respectively. The power-spectrum graphs of FIGS. 2 to 9 used a Unix Xwaves program. The spectrum analysis method parameters include low pass filtering. The analysis type was a CEPST (cepstrally smoothed method) developed by MIT LCS group. The window type is a hanning window and the scale is a log power.

FIGS. 2 and 3 show a noticeable increase in the power fluctuations of music relative to café noise. Accordingly, the measurement window size of 8 seconds used for FIGS. 2 and 3 provides a power-frequency spectrums which readily illustrate the difference between café noise and music, and that café noise is a constant type of noise and music is a dynamic type of noise.

The power-frequency spectrum of FIG. 5 for café noise shows a limited increase in fluctuations relative to the spectrum of FIG. 4. In contrast, the power-frequency spectrum of FIG. 6 for music shows a more significant increase in the fluctuations relative to the spectrum of FIG. 5. Accordingly, the measurement window size of 100 ms used for FIGS. 4 to 6 provides a power-frequency spectrums which readily illustrate the differences between white and café noise, and music, and that white and café noise are each a constant type of noise and music is a dynamic type of noise.

The power-frequency spectrums of FIGS. 7 to 9 for white noise, café noise and music all have significant power fluctuations. Further, the measurement window size of 20 ms used for FIGS. 7 to 9 provides a power-frequency spectrums which provide limited illustration of the differences between white and café noise, and music. Accordingly, this measurement window size and associated power-frequency spectrums provide limited indication that white and café noise are each a constant type of noise and music is a dynamic type of noise.

The power-frequency spectrums of FIGS. 2 and 3, and of FIGS. 4 to 6 for respective measurement window sizes of 8 seconds and 100 ms have similar trends, and are considered stable. Also, these power-frequency spectrums illustrate the characteristic flat power spectrum of white noise and that music has the largest fluctuation. In contrast, the differences in fluctuations for the power-frequency spectrums of FIGS. 7 to 9 for a measurement window size of 20 ms are considerably less, as compared to FIGS. 2 and 3, and FIGS. 4 to 6. As a result, the power-frequency spectrums of FIGS. 7 to 9 provide limited guidance for the distinguishing of white noise and café noise from music. Accordingly, a measurement window size of 20 ms is less effective as compared to measurement window sizes of 8 seconds and 100 ms for determining whether the noise spectrum is constant or dynamic 16. A measurement window size of 100 ms is included in a preferred embodiment of the method 10.

The measurement window size may be used to determine spectrum constancy criteria for ascertaining whether the actual noise on the channel is white noise, café noise or music. For example, one possible set of criteria, for a measurement window size of 100 ms, is that the peak/average ratio for white noise is less than 10 dB, for café noise is between 10 to 15 dB, and for music is more than 15 dB. Another possible set of criteria, for a measurement window size of 100 ms, is that the peak/valley ratio for white noise is less than 10 dB, for café noise is about 20 dB, and for music is about 30 dB. Refining of the criteria for each determination should be based on multiple background noise samples. The sub-band bandwidth used in the calculation should be determined by experimenting on differing background noise samples.

Figure 10:
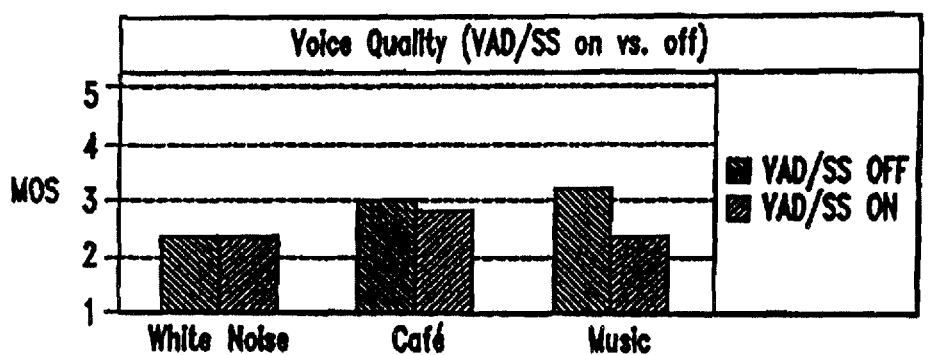
FIG. 10 shows the voice quality for white noise, café noise and music for the VAD/SS system being on and off.

FIG. 10 shows the voice quality of a subjective test for white noise, café noise, and music for the VAD/SS system being on (activated) and off (not activated). More specifically, FIG. 10 shows the results of a test in which a conventional VAD/SS system was operated according to the method 10 and the channel variously had white noise, café noise and music. The test was conducted with a G.729AB coder where the B signifies the use of the coder's associated VAD/SS. The test included mixing white noise, café noise, and music each individually with speech files and transmitting such signal mixtures over a channel which is monitored by the VAD/SS system. The signal to noise ratio was 22 dB and the speech level was −20 dBm. The listeners subjectively evaluated the voice quality for each of the signal mixtures containing alternatively white noise, café noise, and music, and for the VAD/SS system being activated and not activated.

The evaluations were translated into a numerical score and combined into a respective Mean Opinion Score (MOS) corresponding to the white noise, café noise and music. The evaluations were based on a method referred to as MOS testing, which is a form of subjective, customer-opinion testing in which test subjects listen to samples of speech and rate each sample on the following 5-point rating scale: 5=Excellent, 4=Good, 3=Fair, 2=Bad, 1=Poor. MOS testing is the subject of the ITU=T Recommendation P.800 titled "Methods for Subjective Determination of Transmission Quality".

The MOS indicative of the corresponding voice qualities observed during the test are shown in FIG. 10. FIG. 10 indicates that the judged voice quality of the samples for white noise was essentially the same with the VAD/SS system on (active) or off (inactive). The judged voice quality of the samples for café noise was slightly lower, by 0.14 MOS points, with the VAD/SS system being on (active) as compared to being off (inactive). The judged voice quality of the samples for music was significantly lower, by 0.89 MOS points which is nearly a full point, with the VAD/SS system being on (active) as compared to being off (inactive). This indicates that activation of the VAD/SS system introduces a significant negative effect when the noise is music, a smaller but also negative effect when the noise is café noise, and no negative effect when the noise is white noise.

It is possible for the method 10 to include additional steps which provide for the matching noise which is added during the activation of the VAD/SS system 18 to have a similar sound as the actual noise detected on the channel. For example, if the evaluation of the actual noise for the presence of white noise indicates the presence of such noise, then noise which is similar in sound to white noise may be added as the matching noise. Such added matching noise may be supplied to the channel by the VAD/SS system. The similarity in sound between the actual and matching noise may be increased by measuring the power-frequency spectrum, or other precisely definable characteristic of the actual noise on the channel, and adding matching noise having a power-frequency spectrum or such other precisely definable characteristic of the actual noise which is similar to that of the actual noise on the channel. The measuring of the power-frequency spectrum, or other precisely definable characteristic of the actual noise on the channel, and the adding of matching noise having a power-frequency spectrum, or other precisely definable characteristic of the actual noise which is similar to that of the actual noise may be carried out by the VAD/SS system.

This adding of matching noise which is similar in sound to the actual connection noise provides for a blending with, or matching, of the two noises so as to prevent a noise on/noise off modulation sound that is unpleasant to the speaker/listener. Where this added, matching noise is dissimilar to the actual connection noise, the speaker/listener may hear two different noises resulting from the cycling, which is also unnatural and normally undesirable. In an attempt to reduce this mismatch between the real noise and the matching noise, some VAD/SS features, especially some incorporated into speech coder designs, try to design a matching noise that resembles the connection noise in terms of its power, its frequency bandwidth, and its temporal change along both of these dimensions. But even with these more sophisticated algorithms the addition of matching noise frequently sounds unnatural.

It is possible to operate a VAD/SS system according to an embodiment of the method 10 where the VAD/SS system is connected to the channel of a transmission pipe and the channel provides a pathway for the transmission of energy. The energy which is transmitted over the channel may be voice energy, the detection of which is provided by the step 14 of the method 10 of FIG. 1. Alternative forms of energy other than or in addition to voice energy may be carried by the channel and detected by the method 10. The method 10 may provide for the detection of such alternative forms of energy and for activation of the SS system if such alternative forms of energy have specific characteristics. For example, the channel may carry energy which resembles the energy corresponding to the speech of persons talking to one another but such energy is not representative of persons talking to one another over the channel. Energy corresponding to the speech of persons talking to one another over the channel may be referred to as voice energy. Energy which is not voice energy may nevertheless resemble voice energy, such as by being background noise which contains human speech. Such background noise may be from a television or people talking to one another in the presence of the one or more of the users of the channel. The ability to discriminate between these two forms of energy enables the SS system to be activated when the users of the channel stop talking even though energy corresponding to human speech, such as from a television, is being carried by the channel. Consequently, the channel becomes available for transmission of voice energy from other channels.

It is possible to operate a VAD/SS system according to an embodiment of the method 10 which identifies energy carried by the channel which transmits information from one or more senders to one or more recipients. Such communication energy includes voice energy and other forms of energy, such as the energy which corresponds to a text message sent between two or more cellular phones. The ability to discriminate between communication energy and other forms of energy enables the SS system to be suppressed when communication energy is being carried by the channel, even if such communication energy is not voice energy. Consequently, the channel remains available for transmission of communication energy. Also, if communication energy is not being carried by the channel and the energy on the channel has other specific characteristics, then the SS system may be activated to make the channel available for transmission of communication energy from other channels, as indicated by the steps 16, 18 in FIG. 1.

It is also possible to operate a VAD/SS system according to an embodiment of the method 10 in which, if communication energy is not detected on the channel, the SS system is activated depending upon the nature of the energy detected on the channel. For example, the nature of the energy may be indicated by the noise spectrum thereof such that the activation of the SS system depends upon whether the noise spectrum is constant or dynamic, as indicated by the steps 16, 18 in FIG. 1.

It is possible for the activation of the SS system to depend upon other aspects of the nature of the energy detected on the channel. For example, activation of the SS system may depend upon the similarity of the energy on the channel to a matching noise which may be supplied by the VAD/SS system, even though such matching noise may be dynamic.

Additionally, the method 10 may provide for the detection of various types of energy on the channel. For example, such detection may provide for the detection of the voice energy 14, as shown in FIG. 1. The method 10 may provide for the detection of types of energy other than voice or communication energy which also may be advantageously carried by the channel and therefore warrant the SS system to be suppressed. The detection of such advantageously carried energy by the VAD/SS system enables the system to loop back to the step 12 of FIG. 1 without requiring a determination of the nature of the energy, such as by the step 16 of FIG. 1.

The entire disclosures of each of the following U.S. Patent Applications are hereby incorporated by reference herein:

U.S. patent application Ser. No. 10/330,957, Filing Date—Dec. 27, 2002, Title—System and Method for Improved Use of Voice Activity Detection, Applicants—James H. James, Joshua Hal Rosenbluth; and U.S. patent application Ser. No. 10/331,013, Filing Date—Dec. 27, 2002, Title—System and Method for Improved Use of Voice Activity Detection, Applicants—James H. James, Joshua Hal Rosenbluth.

While the embodiments herein have been described by reference to certain preferred embodiments, it should be understood that numerous changes could be made within the spirit and scope of the inventive concept described. Accordingly, it is intended that these embodiments not be limited to the disclosed embodiments, but that it have the full scope permitted by the language of the following claims.

What is claimed is:

1. A method of controlling a communication channel, the method comprising:
    determining, using a processing device, whether there is a decrease in communication energy associated with the communication channel;
    determining, using the processing device, whether noise energy associated with the communication channel is constant based on a spectrum constancy criterion; and
    activating silence suppression, using the processing device, in response to determining that the noise energy associated with the communication channel is constant based on the spectrum constancy criterion and determining that communication energy associated with the communication channel is decreased, the activating of silence suppression comprising associating communication energy with the communication channel that was not already associated with the communication channel prior to activating silence suppression.

2. The method according to claim 1, wherein determining whether the noise energy is constant based on the spectrum constancy criterion comprises analyzing fluctuation in a power frequency spectrum associated with the noise energy.

3. The method according to claim 1, wherein the communication energy comprises a text message.

4. The method according to claim 2, wherein analyzing fluctuation in the power frequency spectrum comprises determining whether the power frequency spectrum is constant, the method further comprising determining that the noise energy associated with the communication channel is constant based on the power frequency spectrum being constant.

5. The method according to claim 1, wherein activating silence suppression further comprises adding matching noise energy to the communication channel, the matching noise energy having a power frequency spectrum matching actual noise on the communication channel.

6. The method according to claim 1, further comprising determining whether there is a decrease in communication energy associated with the communication channel following activation of silence suppression.

7. The method according to claim 1, further comprising de-activating silence suppression in response to determining that the communication energy associated with the communication channel is present.

8. A computer-readable storage device comprising instructions stored thereon that, when executed by a processing device, cause the processing device to perform operations comprising:
    determining whether there is a decrease in communication energy associated with a communication channel;
    determining whether noise energy associated with the communication channel is constant based on a spectrum constancy criterion; and
    activating silence suppression in response to determining that the noise energy associated with the communication channel is constant based on the spectrum constancy criterion and determining that the communication energy associated with the communication channel is decreased, the activating of silence suppression comprising associating communication energy with the communication channel that was not already associated with the communication channel prior to activating silence suppression.

9. The computer-readable storage device according to claim 8, further comprising instructions stored thereon that, when executed by the processing device, cause the processing device to perform operations comprising analyzing fluctuation in a power frequency spectrum associated with the noise energy to determine whether the noise energy is constant.

10. The computer-readable storage device according to claim 8, wherein the communication energy comprises a text message.

11. The computer-readable storage device according to claim 9, further comprising instructions stored thereon that, when executed by the processing device, cause the processing device to perform operations comprising:
    determining whether the power frequency spectrum is constant; and
    determining that the noise energy associated with the communication channel is constant based on the power frequency spectrum being constant.

12. The computer-readable storage device according to claim 8, further comprising instructions stored thereon that, when executed by the processing device, cause the processing device to perform operations comprising adding matching noise energy to the communication channel, the matching noise energy having a power frequency spectrum matching actual noise on the communication channel.

13. The computer-readable storage device according to claim 8, further comprising instructions stored thereon that, when executed by the processing device, cause the processing device to perform operations comprising determining whether there is a decrease in communication energy associated with the communication channel following activation of silence suppression.

14. The computer-readable storage device according to claim 8, further comprising instructions stored thereon that, when executed by the processing device, cause the processing device to perform operations comprising de-activating silence suppression in response to determining that the communication energy associated with the communication channel is present.

15. An apparatus to control a communication channel, the apparatus comprising:
    a processing device; and
    a computer-readable storage device storing instructions that, when executed by the processing device, cause the processing device to perform operations comprising:
        determining whether there is a decrease in communication energy associated with the communication channel;
        determining whether noise energy associated with the communication channel is constant based on a spectrum constancy criterion; and
        activating silence suppression in response to determining that the noise energy associated with the communication channel is constant based on the spectrum constancy criterion and that the communication energy associated with the communication channel is decreased, the activating of silence suppression comprising associating communication energy with the communication channel that was not already associated with the communication channel prior to activating silence suppression.

16. The apparatus according to claim 15, wherein the instructions, when executed by the processing device, further cause the processing device to perform operations comprising analyzing fluctuation in a power frequency spectrum associated with the noise energy to determine whether the noise energy is constant.

17. The apparatus according to claim 16, wherein the instructions, when executed by the processing device, further cause the processing device to perform operations comprising analyzing fluctuation in the power frequency spectrum for a duration of 100 msec.

18. The apparatus according to claim 16, wherein the instructions, when executed by the processing device, further cause the processing device to perform operations comprising:

determining whether the power frequency spectrum is constant; and determining that the noise energy associated with the communication channel is constant based on the power frequency spectrum being constant.

19. The apparatus according to claim 15, wherein the instructions, when executed by the processing device, further cause the processing device to perform operations comprising disabling silence suppression in response to determining that the communication energy associated with the communication channel is present.

20. The apparatus according to claim 15, wherein the instructions, when executed by the processing device, further cause the processing device to perform operations comprising determining whether there is a decrease communication energy associated with the communication channel following activation of silence suppression.

* * * * *